United States Patent
Cawson

(10) Patent No.: US 9,485,363 B1
(45) Date of Patent: *Nov. 1, 2016

(54) TESTING COMPUTERIZED ANALYSIS OF COMMUNICATION DATA

(71) Applicant: International Business Machines Corporation, Armonk, NY (US)

(72) Inventor: Michael G. Cawson, Cambs (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/051,747

(22) Filed: Feb. 24, 2016

Related U.S. Application Data

(63) Continuation of application No. 14/693,395, filed on Apr. 22, 2015, now Pat. No. 9,313,340.

(51) Int. Cl.
| | | |
|---|---|---|
| *H04M 15/00* | (2006.01) | |
| *H04W 24/08* | (2009.01) | |
| *H04W 4/02* | (2009.01) | |

(52) U.S. Cl.
CPC ............. *H04M 15/41* (2013.01); *H04W 4/02* (2013.01); *H04W 24/08* (2013.01)

(58) Field of Classification Search
CPC .................... H04L 2001/0092; H04M 15/41; H04M 2203/556
See application file for complete search history.

(56) References Cited

U.S. PATENT DOCUMENTS

| | | | |
|---|---|---|---|
| 5,812,545 A | 9/1998 | Liebowitz et al. | |
| 9,313,340 B1 * | 4/2016 | Cawson ............... | H04M 15/41 |
| 2005/0041584 A1 | 2/2005 | Lau et al. | |

(Continued)

FOREIGN PATENT DOCUMENTS

| | | |
|---|---|---|
| WO | 2008051210 A2 | 5/2008 |
| WO | 2010052695 A1 | 5/2010 |
| WO | 2012052707 A1 | 4/2012 |

OTHER PUBLICATIONS

Fan, Yongquan, et al; "BER Testing of Communication Interfaces." Instrumentation and Measurement, IEEE Transactions, vol. 57, No. 5, May 2008, pp. 897-906.

(Continued)

*Primary Examiner* — Curtis Odom
(74) *Attorney, Agent, or Firm* — Steve Kurlowecz; SVL IPLaw Edell, Shapiro & Finnan, LLC

(57) ABSTRACT

In testing a computerized analysis of communication data, a uniform random time interval is generated to provide an incremental value of time for each communication, between a plurality of communication devices via one or more intermediate transmission devices. For each communication, the identifier for the communication device originating that communication, the identifier for the communication device receiving that communication, and the identifiers for the intermediate transmission devices associated with the originating communication device and the receiving communication device are determined. A communication data set including the time value, the determined communication devices, and the determined intermediate transmission devices of each communication is produced and applied to the computerized analysis of communication data. One or more errors are determined in the computerized analysis based on processing of the communication data set.

20 Claims, 3 Drawing Sheets

(56) References Cited

U.S. PATENT DOCUMENTS

| | | |
|---|---|---|
| 2006/0187850 A1 | 8/2006 | Ward et al. |
| 2006/0274703 A1 | 12/2006 | Connelly |
| 2007/0174663 A1 | 7/2007 | Crawford et al. |
| 2008/0192911 A1 | 8/2008 | Seo |
| 2012/0020293 A1 | 1/2012 | Nix, Jr. et al. |
| 2014/0293807 A1 | 10/2014 | Devolites et al. |

OTHER PUBLICATIONS

Cochinwala, Munir, et al; "Near Real-Time Call Detail Record ETL Flows." In Enabling Real-Time Business Intelligence, Springer-Verlag, Berlin Heidelberg, 2010, pp. 142-154.

Rostamzadeh Bakhtiyari, et al; "Developing a Simulator Application to Test the Billing Platform in Telecom Industry." http://eprints.qut.edu.au/52704/, copyright 2012, 7 pages.

Guo et al., "Estimate the Call Duration Distribution Parameters in GSM System Based on K-L Divergence Method", IEEE 1-4244-1312-5/07, copyright 2007, pp. 2988-2991.

Seshadri et al., "Mobile Call Graphs: Beyond Power-Law and Lognormal Distributions", KDD'08, Aug. 24-27, 2008, Las Vegas, Nevada, USA, copyright 2008, ACM 978-1-60558-193-4/08/08, 9 pages.

Vaz de Melo et al., "Surprising Patterns for the Call Duration Distribution of Mobile Phone Users", Springer-Verlag, Berlin Heidelberg, 2010, pp. 354-369.

"Call Detail Record Generator", http://www.gedis-studio.com/on-line-call-detail-records-cdr-generat . . . , accessed from Internet Feb. 2, 2015, 5 pages.

List of IBM Patents or Patent Applications Treated As Related, Feb. 24, 2016, 1 page.

\* cited by examiner

TESTING COMPUTERIZED ANALYSIS OF COMMUNICATION DATA

CROSS-REFERENCE TO RELATED APPLICATIONS

This application is a continuation of U.S. patent application Ser. No. 14/693,395, entitled "TESTING COMPUTERIZED ANALYSIS OF COMMUNICATION DATA" and filed on Apr. 22, 2015, which is incorporated herein by reference in its entirety.

BACKGROUND

1. Technical Field

Present invention embodiments relate to testing computerized analysis of communication data, such as call detail record data, and more specifically, to testing computerized analysis of a synthetic communication data set that realistically models a genuine communication data set with a manageable memory footprint.

2. Discussion of the Related Art

Communication data is frequently used to track details or attributes about various communications, including usage rates, usage patterns, communication locations (both originating and receiving locations), and communication duration. For example, a call detail record ("CDR") is a data record that includes details or attributes of a telephone call, such as an initiation time, a source or originating phone number, a call duration, an identifier of a source phone, an identifier of a cell tower handling the call, etc. CDR data is typically generated by telecommunications equipment as a telephonic communication (e.g., a text message or phone call) passes therethrough and is frequently used by telecommunications companies for billing. Moreover, since CDR data includes a wealth of social and lifestyle information, CDR data is also important for commercial purposes (e.g., targeted advertising), law enforcement purposes, and national security investigations. However, real CDR data is often difficult to obtain without significant justification because CDR data is both massive (e.g., many billions of records per day) and extremely sensitive (commercially and personally). Accordingly, CDR data analysis tools must be built, developed, and tested with synthetic CDR data.

One approach for generating synthetic communication data is to generate random values for the attributes (e.g., date, time, duration, cell tower ID, etc.) of each communication. However, in genuine CDR data, insofar as genuine is simply intended to mean real, these attributes have complex and subtle correlations that are not accurately modeled by a random selection of values. Consequently, other approaches for generating synthetic CDR data rely on detailed and complex configuration data, such as a contact list of other communication devices, a time-of-day usage profile, and a day-of-week usage profile, for each communication device involved in a simulation. In these approaches, an agent is then effectively used to mimic the behavior of each communication device in the simulation in view of its configuration data. While this approach may be suitable for generating highly realistic call patterns for a small number of phones, it requires a massive overhead to generate and store millions of phone configurations which is undesirable for effectively testing analysis tools that are intended for communication data.

SUMMARY

According to one embodiment of the present invention, a uniform random time interval is generated to provide an incremental value of time for each communication in communication data. Each communication occurs between a plurality of communication devices via one or more intermediate transmission devices. For each communication, an identifier for the communication device originating that communication, an identifier for the communication device receiving that communication, an identifier for the intermediate transmission device associated with the originating communication device of that communication, and an identifier for the intermediate transmission device associated with the receiving communication device of that communication are determined. A communication data set including the time value, the determined communication devices, and the determined intermediate transmission devices of each communication is produced and applied to the computerized analysis of communication data to determine one or more errors in the computerized analysis based on processing of the communication data set.

In the aforementioned embodiment, for each communication, the identifier for the communication device originating that communication is determined based on a first random variable, a duration of that communication, and a first time interval between communications for the originating communication device. By comparison, for each communication, the identifier for the communication device receiving that communication is determined based on a deviation from the identifier for the originating communication device and the duration of that communication. The deviation is based on a second random variable scaled by a group size of communication devices associated with the originating communication device for that communication. Furthermore, the identifiers for the intermediate transmission devices associated with the originating and receiving communication devices of that communication are determined based on a first random variation from the identifier of the originating communication device and a second random variation from the identifier of the receiving communication device, respectively.

BRIEF DESCRIPTION OF THE DRAWINGS

Generally, like reference numerals in the various figures are utilized to designate like components.

DETAILED DESCRIPTION

Figure 1:
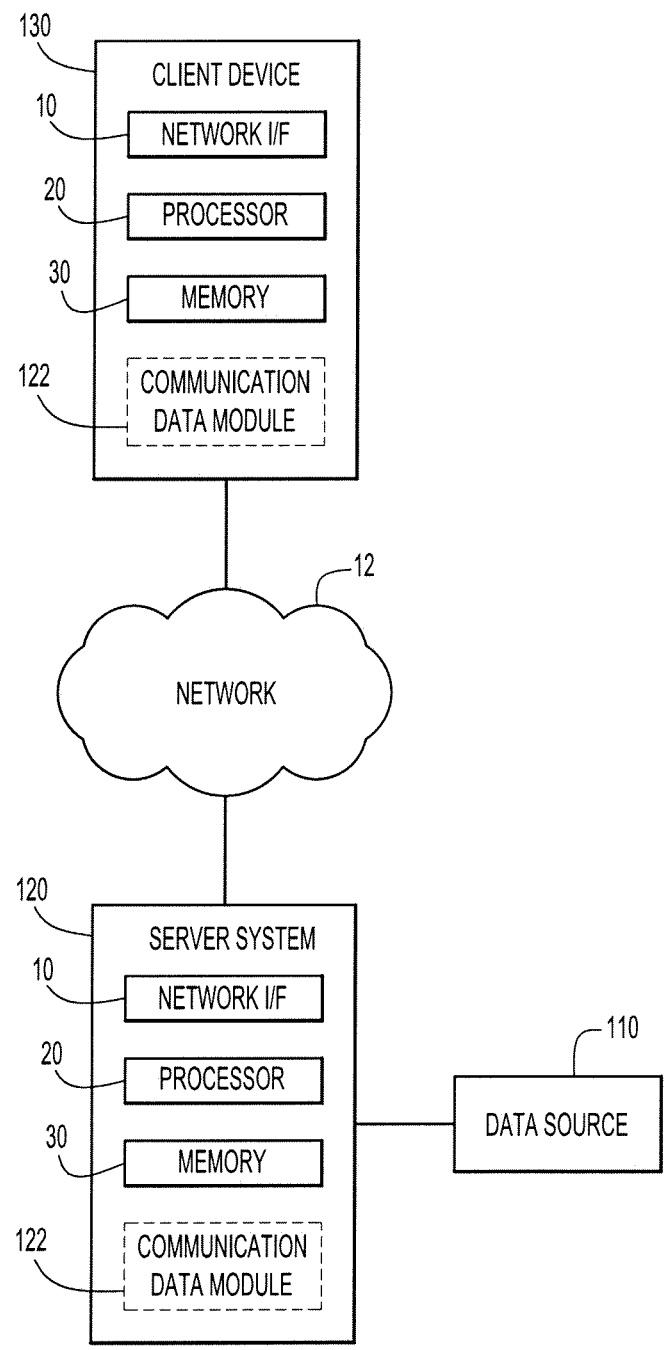
FIG. 1 illustrates an example environment in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Figure 2:
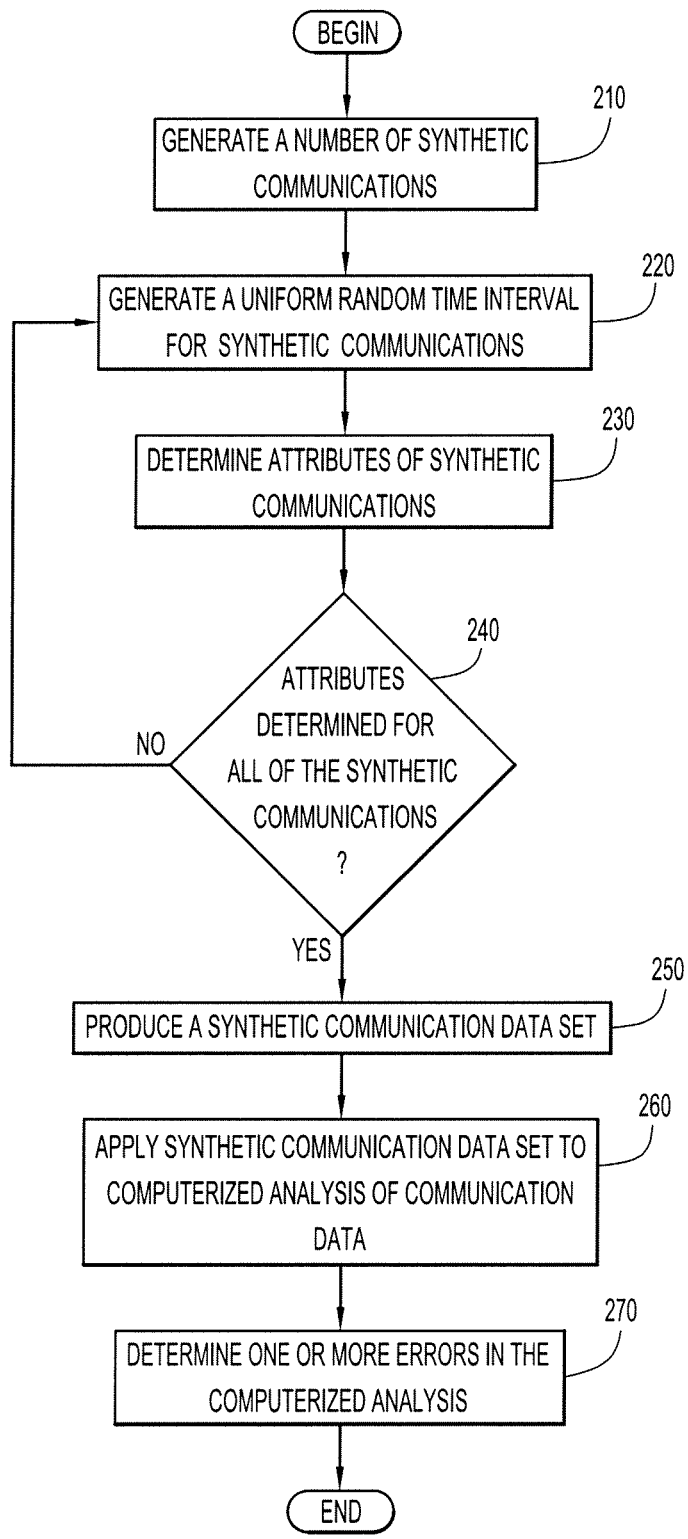
FIG. 2 is a procedural flow chart of an example method of testing computerized analysis of communication data according to a present invention embodiment.
Figure 3:
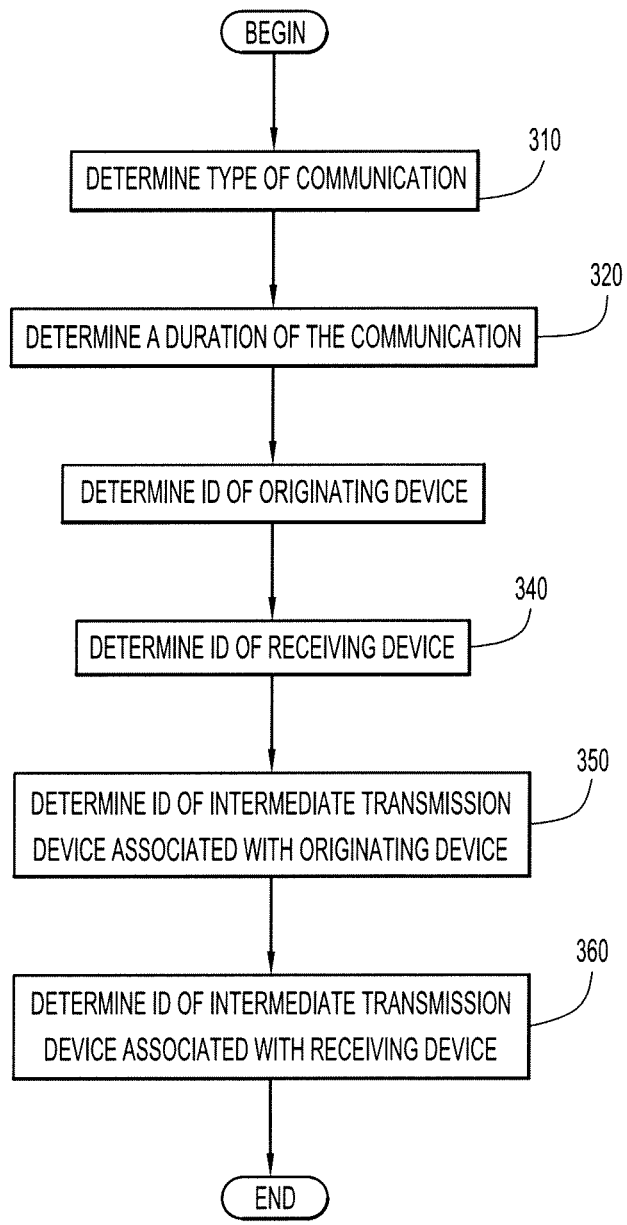
FIG. 3 is a procedural flow chart of an example method of generating attributes for a communication data set according to a present invention embodiment.

Generally referring to the FIGS. 1-3, present invention embodiments are configured to generate a synthetic communication data set that can be used to realistically test a computerized analysis of communication data. The synthetic communication data set simulates or includes various characteristics and attributes of a genuine communication data set so that the synthetic communication data set provides accurate testing. However, when used herein, the term "synthetic" is simply intended to mean that the communication data set is created or generated from simulations. Thus, in some embodiments, the synthetic communication data may be created without any interaction with a real communication network. For example, present invention embodiments may generate a synthetic CDR data set that mimics at least some of the characteristics of genuine CDR records without interacting with any real telecommunication networks.

Due at least in part to being insulated from real communications networks, a synthetic communication data set generated in accordance with present invention embodiments has a small memory footprint (e.g., 9 bytes per phone), but still naturally generates data in realistic, time sequence order, as is described in detail below. However, at the same time, when a synthetic communication data set generated in accordance with present invention embodiments is needed for big data applications, the synthetic communication data set can be scaled as needed. For example, multiple, independent generators working in parallel on different date ranges can scale a 9 byte per phone synthetic CDR data set to terabytes.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a communication data module 122. The communication data module 122 may be implemented across plural server systems. Alternatively, the communication data module 122, or at least a portion thereof, may reside on a client system 130 for use with an interface of the client system 130. Client systems 130 enable users to communicate with the server system 120 (e.g., via network 12). The client systems may present any graphical user interface (e.g., GUI, etc.) or other interface (e.g., command line prompts, menu screens, etc.) to receive commands from users and interact with the communication data module 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software.

The communication data module 122 may include one or more modules or units to perform the various functions of present invention embodiments described below. The communication data module 122 may be implemented by any combination of any quantity of software and/or hardware modules or units, and/or may reside within memory 30 of a server system and/or client systems for execution by processor 20.

A manner of testing computerized analysis of communication data (e.g. via communication data module 122, server system 120 and/or client system 130) according to an embodiment of the present invention is illustrated in FIG. 2. Generally, in communications networks, data may be generated at a number of pieces of transmission devices (NT) for a number of communications (NC) between a number of communication devices (NP) over a period of time from T0 to TN. For example, in a telecommunications network, CDR data may be generated at cell towers for a number of calls between phones over a period of time. Consequently, at step 210, a number of synthetic communications (NC) are generated between a number of synthetic communication devices (NP) via a number of transmission devices (NT). In preferred embodiments, NP is a perfect square in order to model the significant variation in the number of communications initiated from different communication devices that is present in genuine communication networks, as is explained in detail below.

More specifically, at step 210, NP communication devices are generated in any desirable manner and each communication device is assigned an integer ID from 0 to (NP−1) at random. Each communication device may also be associated with a 'busy-until' value that indicates a device is unavailable for communication for a certain time period or until a certain time and the 'busy-until' value for each communication device is initially set to T0. Additionally, geographical data, such as the longitudes and latitudes, of the NT communication equipment is generated at step 210. In some embodiments, the geographical data may be generated or obtained from the geographical data of real equipment, such as the geographical location of cell phone towers, if desired. However, in other embodiments, the geographical data may be generated in any desirable manner. Regardless, once the geographical data is generated, the communication equipment is sorted in a desirable geographical order or arrangement and each piece of equipment is assigned an integer ID from 0 to NP−1. For example, in some embodiments, the communication equipment may be arranged in a spiral outwards from a central point and in other embodiments the communication equipment may be sorted using a 2-D space filling curve and then assigned ascending integer IDs in that order.

Additionally, in real communication networks, each communication device tends to communicate with a clique of other communication devices regularly, plus occasional communications to non-clique devices. The size of a clique varies from device to device, but in comparison with the total number of devices in a network, a clique is always quite small. In some embodiments, each communication device may also be randomly assigned a clique size at step 210 in order to accurately model this aspect of communication networks. As is discussed in detail below, using a clique-size may enable the clique aspect of communication networks to be modeled without storing an array of IDs for each device. In other words, modeling the clique aspect of communication networks with a clique size may negate the need to store IDs of communication devices as the members of each device's clique. Consequently, a randomly assigned clique size may reduce the memory footprint of the synthetic communication data set and reduce processing inefficiency when the synthetic data set is processed, especially when processing very large datasets involving hundreds of millions of devices.

At step 220, a uniform random time-interval, dt (rather than a random time within the overall time period) is generated, insofar as "uniform random" is intended to mean that the time interval is generated from a uniform random variable, not that the time interval is necessarily uniform (in fact, the time interval is preferable not uniform). The time interval, dt, is between 0 and 2i, where i is the current average interval between synthetic communications, taking account of whatever time-variability function in the synthetic communication rate is realistic for the purpose. For example, in some embodiments, $i=k*(1.0+0.9*\cos(\theta))$, where k is NC/(TN−TO) and $\theta$ is the current time of day expressed as angle. Preferably, the time-variability function (e.g., $1+0.09*\cos(\theta)$), should have an average value of approximately 1 so that, over many cycles, the average interval is approximately k. Generating a uniform time interval in this manner may accurately simulate that the synthetic communication data, such as synthetic CDR data, is time sorted and varies very significantly in daily and/or weekly communication rates, similar to genuine communication data.

At step 230, attributes are determined for each synthetic communication at the current time (t). As is discussed below in detail with regards to FIG. 3, the determined attributes may each simulate different characteristics of real communication data. For example, when the communication data simulates CDR data, the attributes determined at step 230 may simulate at least some of the following characteristics of CDR data: (1) the duration of voice calls is roughly represented by a Log Normal distribution with a long tail towards long duration calls; (2) there is a significant variation in the number of calls made from different phones; (3) most phones are not simultaneously on more than one call; (4) each phone number tends to call a small clique of other phones regularly, plus occasional calls to non-clique phones; (5) most phones (even mobile phones) operate within a 'home' locality most of the time with occasional visits to non-home locations; and (6) the clique of a phone is usually local to the phone's home location. However, this list of characteristics is not intended to be exclusive and, in other embodiments, the attributes determined at step 230 may simulate other desirable characteristics, such as a silent/sleeping period for certain devices and other such characteristics. Regardless of the attributes determined at step 230, once attributes are determined for synthetic communications at a certain time, time is incremented from t to t+dt, and various attributes are determined for each synthetic communication at the new time.

If, at step 240, it is determined that attributes have not been determined for each of the NC synthetic communications, the synthetic communications will continue to be processed at step 220 in order to determine attributes for all of the synthetic communications included in the NC synthetic communications over the desired time period. In preferred embodiments, each generated synthetic communication is output as it is generated (e.g. once desirable attributes are determined), such that the data set produced at step 250 is produced as the synthetic communications are being generated (e.g., one communication at a time). In some of these embodiments, each generated synthetic communication is stored, perhaps in a specific file, as it is generated. However, in other embodiments, each generated synthetic communication is sent directly to the input of the computerized data analysis, thereby allowing the data set to be analyzed as it is produced. In other words, in some embodiments, the entire data set is produced at step 250 and then applied to a computerized analysis at step 260, but in other embodiments, the generated synthetic communications may be output directly to the computerized analysis and analyzed as it received.

Outputting the generated synthetic communications directly to the computerized analysis may be well-suited for real-time computerized data analysis without any file or database buffering. However, as mentioned, in some embodiments, the synthetic communication data set may be scaled up in order to produce a synthetic communication data set suitable for big data analytics prior to being streamed or otherwise output to the computerized analysis. Regardless of how a synthetic communication data set is produced, when the synthetic communication data set is applied to a computerized analysis of synthetic communication data, such as an analysis tool configured to analyze CDR records to recognize users with specific call patterns from certain locations for targeted advertising, one or more errors can be determined in the computer analysis based on the testing performed with the synthetic communication data set at step 270. In other words, a computerized analysis may be tested for errors with the generated synthetic communication data set.

In some embodiments, the synthetic communications included in the synthetic communication data set may be subtly different from genuine communication data. For example, when the synthetic communication data set is a synthetic CDR data set, the synthetic data set may be subtly different from genuine CDR data in at least some of the following manners: (1) genuine CDR data may include actual phone numbers rather than integer IDs; (2) genuine CDR data includes cell tower identifiers that include local area numbers and cell id components (and sometimes mobile country code and mobile network numbers) rather than integer IDs; (3) genuine CDR data does not have From and To fields but has fields that represent 'the phone that is the subject of the CDR record' and 'the other phone'; (4) genuine CDR data does not include the cell tower information for the 'other' phone (only for the 'subject' phone); and (5) genuine CDR data usually includes the SIM and Handset numbers (IMSI and IMEI) as well as the phone number for the subject phone.

In view of these differences, in some embodiments, when the synthetic communication data set is produced, portions of the data included in each communication may be slightly adjusted or converted to more accurately model genuine communication data. For example, in order to address the first and second differences laid out above, in some embodiments, the integer ID's of the originating and receiving devices may be converted to phone numbers and/or the integer ID's of the communication equipment may be converted to tower identifiers with the appropriate numbers and components at step 250 using the mappings initially utilized to assign the integer ID's (e.g., at step 210). Similarly, in some embodiments, the fifth difference discussed above may be addressed by mapping SIM and Handset numbers to device ID's at step 250. Typically, there is a 1:1 relationship between phone numbers and the SIM and Handset numbers which makes this mapping relatively simple; however, additional modeling may be required to take SIM-swaps and SIM-to-phone-number changes into account. By comparison, in order to address the third and fourth differences laid out above, in some embodiments, an extra Call Type field can be generated and/or the extraneous cell tower ID may be dropped, respectively, for each communication, at step 250. If a Call Type field is added to the data, the Call Type field may be filled with "Outgoing" or "Incoming" values in order to allow the communication data to be converted between From/To and Subject/Other.

Now turning to FIG. 3, one example embodiment of a method of determining attributes of communications is shown. However, it is to be understood that the method illustrated in FIG. 3 and described below is only one example embodiment and that in different embodiments attributes may be determined in various manners. Moreover, in other embodiments, different attributes may be determined for each communication.

In the embodiment shown in FIG. 3, a communication type may be determined for each communication in any desirable random manner at step 310. In preferred embodiments, the communication type is selected with deference to appropriate likelihoods (e.g., voice call 40%, fax 10% and text 50%). However, regardless of how the communication type is determined, each different type of communication may be assigned a specific duration. For example, if the communication is determined to be a 'Voice' communication then a duration, d, may be determined for the communication. The duration may be determined by an Inverse Distribution Function (IDF), which can be pre-computed into a look-up table for a number of values (e.g., a few thousand values) between 0 and 1 in order to accurately simulate that the duration of voice communications is roughly represented by a Log Normal distribution with a long tail towards long duration communications, as mentioned above. Alternatively, if the communication is not a voice communication, the duration of that communication may be determined to be 0.

Then, at step 330, the ID of the originating device may be determined. In some embodiments, the originating device is determined with a series of steps. More specifically, first, a uniform random variable between 0 and 1 is squared and multiplied by the number of phones, NP. Then, this number is split into two parts: 'A' and 'B'. A is the integer of the number divided by $\sqrt{N_P}$ and B is modulo($\sqrt{N_P}$) Then, the two parts are recombined to make the phone ID, so that the ID=b*$\sqrt{N_P}$+a. Notably, squaring of the random variable in the first step makes low numbers more likely to be selected than high numbers while swapping the high and low-order $\sqrt{N_P}$ components of the number spreads out the more and less likely chosen numbers uniformly over the entire range of Np. Consequently, the determined IDs of the originating devices may accurately simulate that there is a significant variation in the number of communications made from different communication devices, as mentioned above.

However, if at step 330, the ID of the determined communication device has a busy-until value that is greater than t, the determined ID and the aforementioned steps may be repeated in order to determine a different ID for the originating device. Additionally, the originating device's busy-until value may be set to t+dt+rest-time, where rest-time is the minimum interval between calls for a single phone. This may accurately simulate that most phones are not simultaneously on more than one call, as mentioned above.

Once an ID is determined for the originating device, an ID may be determined for the receiving device at step 340. In some embodiments, the ID of the receiving device (IDR) may be determined as a deviation (e.g., a delta) from the originating device's ID (IDM) using a Gaussian random variable, scaled by the clique size of the originating device, or in formulaic terms, IDR=IDM+G(clique-size), where G( ) is a random Gaussian variable with a mean of zero and variable variance. However, if the deviation (e.g. the delta) is zero, a random recipient device may be selected from all of the devices in order to simulate an out-of-clique call. Determining the recipient device in this manner accurately simulates that originating devices tend to call a small clique of phones regularly and occasionally call phones outside of the clique. However, again, if the determined receiving device has a busy-until value that is greater than t, the receiving device may be rejected and the aforementioned steps may be performed again in order to determine an ID of a receiving device that is not busy. Also, the receiving device's busy-until value may again be set to t+d+rest-time.

Once the device ID's have been determined, the ID's of the transmission devices associated with the devices may then be determined. In particular, at step 350, the ID of the transmission device associated with the originating device may be determined by scaling the originating device ID and adding a random Gaussian variation. In some embodiments, if the variation is larger than a threshold (e.g., a 5% probability), a random transmission device may be selected in order to simulate an away-from-home communication. Determining the ID of the transmission device associated with the originating device in this manner may accurately simulate that most communication devices operate within a home locality most of the time with only occasional visits to non-home locations.

At step 360, the ID of the transmission device associated with the receiving device may be determined in the same manner with relation to the receiving device which may accurately simulate that the clique of a communication device is mostly local to the communication device. Specifically, the ID of the transmission device associated with the receiving device may be determined by scaling the receiving device ID and adding a random Gaussian variation. Again, if the variation is larger than a threshold (e.g., a 5% probability), a random transmission device may be selected in order to simulate an away-from-home communication.

One advantage of the methods shown in FIG. 3 and described above is that the synthetic communication data is produced in a date order. The date order of the synthetic communication data is important because, although post-sorting is conceptually simple, the method shown in FIG. 3 and described above is capable of generating attributes for synthetic communications at real-time data rates, making it possible for the synthetic data to be streamed directly into real-time analytics. If the synthetic data had to be post sorted, this would not be possible. This is particularly advantageous for testing big data analytics where sorting massive datasets would be inefficient and very resource consuming.

Another advantage of the above-described procedures is the ability to model realistic home and away location data, embodied in the cell tower IDs, and the correlation between a phone's clique of often called numbers and the phone's home location.

It will be appreciated that the embodiments described above and illustrated in the drawings represent only a few of the many ways of implementing embodiments of testing computerized analysis of communication data The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., device ID's). The database system may be implemented by any number of any conventional or other databases, data stores or storage structures (e.g., files, databases, data structures, data or other repositories, etc.) to store information (e.g., device ID's). The database system may be included within or coupled to the server and/or client systems. The database systems and/or storage structures may be remote from or local to the computer or other processing systems, and may store any desired data (e.g., device ID's).

The present invention embodiments may employ any number of any type of user interface (e.g., Graphical User Interface (GUI), command-line, prompt, etc.) for obtaining or providing information (e.g., progress of the communication data set production), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method of testing computerized analysis of communication data comprising:
  generating a uniform random time interval to provide an incremental value of time for each communication in the communication data, wherein each communication occurs between a plurality of communication devices via one or more intermediate transmission devices;
  determining for each communication:
    an identifier for an originating communication device based on a first random variable, a duration of that communication, and a first time interval between communications for the originating communication device;
an identifier for a receiving communication device based on a deviation from the identifier for the originating communication device and the duration of that communication; and
an identifier for a first intermediate transmission device associated with the originating communication device of that communication;
producing a communication data set including the time value, the originating communication device, the receiving communication device, and the intermediate transmission device of each communication; and
applying the communication data set to the computerized analysis of communication data to detect errors in the computerized analysis.

2. The method of claim 1, further comprising:
generating for each communication an identifier for a second intermediate transmission device associated with the receiving communication device of that communication; and
assigning the identifiers for the first intermediate transmission device and the second intermediate transmission device to the intermediate transmission devices by:
generating geographic location information for each intermediate transmission device;
sorting the intermediate transmission devices based on the geographic location information; and
assigning the identifiers to the sorted intermediate transmission devices.

3. The method of claim 1, wherein the communication data set includes generated call detail records, the communication devices include cellular telephones, and the intermediate transmission devices include cellular towers for transmitting cellular signals.

4. The method of claim 3, wherein the identifiers for the communication devices are associated with telephone numbers, and the identifiers for the intermediate transmission devices are associated with local area numbers and cellular identification components.

5. The method of claim 1, further comprising:
randomly determining a type for each communication; and
assigning the duration for each communication based on the type.

6. The method of claim 1, wherein determining the identifier for the originating communication device for each communication further comprises:
applying a function to the first random variable to produce a function result and applying the function result to a quantity of the communication devices to produce an initial identifier; and
applying the initial identifier to a ratio of a quantity of the intermediate transmission devices to a quantity of the communication devices.

7. The method of claim 1, wherein determining the identifier for the receiving communication device for each communication further comprises:
applying the identifier of the originating communication device to a ratio of a quantity of the intermediate transmission devices to a quantity of the communication devices to produce an applied result; and
combining the applied result with the second random variable having a variance of the associated group size.

8. The method of claim 4, wherein producing the communication data set further comprises:
converting the determined identifiers of the communication devices to the associated telephone numbers; and
converting the determined identifiers of the intermediate transmission devices to the associated local area numbers and cellular identification components.

9. A system for testing computerized analysis of communication data comprising:
a processor configured to:
generate a uniform random time interval to provide an incremental value of time for each communication in the communication data, wherein each communication occurs between a plurality of communication devices via one or more intermediate transmission devices;
determine for each communication:
an identifier for an originating communication device based on a first random variable, a duration of that communication, and a first time interval between communications for the originating communication device;
an identifier for a receiving communication device based on a deviation from the identifier for the originating communication device and the duration of that communication; and
an identifier for a first intermediate transmission device associated with the originating communication device of that communication;
produce a communication data set including the time value, the originating communication device, the receiving communication device, and the intermediate transmission device of each communication; and
apply the communication data set to the computerized analysis of communication data to detect errors in the computerized analysis.

10. The system of claim 9, wherein the processor is further configured to:
generate for each communication an identifier for a second intermediate transmission device associated with the receiving communication device of that communication; and
assign the identifiers for the first intermediate transmission device and the second intermediate transmission device to the intermediate transmission devices by:
generating geographic location information for each intermediate transmission device;
sorting the intermediate transmission devices based on the geographic location information; and
assigning the identifiers to the sorted intermediate transmission devices.

11. The system of claim 9, wherein the processor is further configured to:
randomly determine a type for each communication; and
assign the duration for each communication based on the type.

12. The system of claim 9, wherein the processor, in determining the identifier for the originating communication device for each communication, is further configured to:
apply a function to the first random variable to produce a function result and apply the function result to a quantity of the communication devices to produce an initial identifier; and
apply the initial identifier to a ratio of a quantity of the intermediate transmission devices to a quantity of the communication devices.

13. The system of claim 9, wherein the processor, in determining the identifier for the receiving communication device for each communication, is further configured to:

apply the identifier of the originating communication device to a ratio of a quantity of the intermediate transmission devices to a quantity of the communication devices to produce an applied result; and combine the applied result with the second random variable having a variance of the associated group size.

14. The system of claim 9, wherein the identifiers for the communication devices are associated with telephone numbers, the identifiers for the intermediate transmission devices are associated with local area numbers and cellular identification components, and the processor, in producing the communication data set, is further configured to:

convert the determined identifiers of the communication devices to the associated telephone numbers; and convert the determined identifiers of the intermediate transmission devices to the associated local area numbers and cellular identification components.

15. A computer program product for testing computerized analysis of communication data, comprising a non-transitory computer-readable storage medium having computer-readable program code embodied thereon, the computer-readable program code, when executed by a processor, causes the processor to:

generate a uniform random time interval to provide an incremental value of time for each communication in the communication data, wherein each communication occurs between a plurality of communication devices via one or more intermediate transmission devices;

determine for each communication:

an identifier for an originating communication device based on a first random variable, a duration of that communication, and a first time interval between communications for the originating communication device;

an identifier for a receiving communication device based on a deviation from the identifier for the originating communication device and the duration of that communication; and an identifier for a first intermediate transmission device associated with the originating communication device of that communication;

produce a communication data set including the time value, the originating communication device, the receiving communication device, and the intermediate transmission device of each communication; and apply the communication data set to the computerized analysis of communication data to detect errors in the computerized analysis.

16. The computer program product of claim 15, wherein the computer-readable program code is further configured to cause the processor to:

generate for each communication an identifier for a second intermediate transmission device associated with the receiving communication device of that communication; and assign the identifiers for the first intermediate transmission device and the second intermediate transmission device to the intermediate transmission devices by:

generating geographic location information for each intermediate transmission device;

sorting the intermediate transmission devices based on the geographic location information; and assigning the identifiers to the sorted intermediate transmission devices.

17. The computer program product of claim 15, wherein the computer-readable program code is further configured to cause the processor to:

randomly determine a type for each communication; and assign the duration for each communication based on the type.

18. The computer program product of claim 15, wherein the computer-readable program code that causes the processor to determine the identifier for the originating communication device for each communication is further configured to cause the processor to:

apply a function to the first random variable to produce a function result and apply the function result to a quantity of the communication devices to produce an initial identifier; and apply the initial identifier to a ratio of a quantity of the intermediate transmission devices to a quantity of the communication devices.

19. The computer program product of claim 15, wherein the computer-readable program code that causes the processor to determine the identifier for the receiving communication device for each communication is further configured to cause the processor to:

apply the identifier of the originating communication device to a ratio of a quantity of the intermediate transmission devices to a quantity of the communication devices to produce an applied result; and combine the applied result with the second random variable having a variance of the associated group size.

20. The computer program product of claim 15, wherein the identifiers for the communication devices are associated with telephone numbers, the identifiers for the intermediate transmission devices are associated with local area numbers and cellular identification components, and the computer-readable program code that causes the processor to produce the communication data set, is further configured to:

convert the determined identifiers of the communication devices to the associated telephone numbers; and convert the determined identifiers of the intermediate transmission devices to the associated local area numbers and cellular identification components.

* * * * *